United States Patent Office 2,845,411
Patented July 29, 1958

2,845,411
VULCANIZATION OF RUBBERS

William D. Willis, Wilmington, Del., assignor to Hercules Powder Company, Wilmington, Del., a corporation of Delaware No Drawing. Application May 15, 1956
Serial No. 584,901

11 Claims. (Cl. 260—94.7)

This invention relates to the art of rubber compounding and more particularly to an improved process of vulcanizing natural and synthetic rubbers.

In the past the rubber industry has depended almost entirely upon sulfur or sulfur-bearing materials as vulcanizing agents. It has recently been discovered, however, that certain types of organic peroxides are capable of acting as vulcanizing agents and are capable of producing a vulcanized rubber having certain properties that are superior to those obtainable through the use of sulfur or sulfur-bearing materials. Certain organic peroxides which have been found to be highly efficient and valuable agents for vulcanizing both natural and synthetic rubbers are characterized by the general formula:

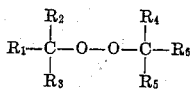

wherein $R_1$ is aryl, $R_2$, $R_3$, $R_4$, and $R_5$ are hydrogen or alkyl groups of less than 4 carbon atoms, and $R_6$ is aryl. The use of these peroxides as vulcanizing agents has enabled the art to obtain vulcanizates of many outstanding properties and increasing commercial use of these peroxides appears destined.

Despite the outstanding results obtainable by the use of the aforesaid peroxides as vulcanizing agents, one deterrent to their use is their relatively high cost in comparison with the conventional vulcanizing agents. It is important, therefore, that the amount of peroxide used in any given formulation be kept at a minimum.

In earlier experiments utilizing the aforesaid peroxides as vulcanizing agents, it was found that certain types of fillers, notably those inorganic fillers which are acid in reaction, detract from the vulcanizing ability of the peroxides. Consequently, when such fillers are employed in the compounding of a rubber composition, it is necessary to employ more than the usual amount of peroxide in order to obtain the full advantages of vulcanization with the peroxide. For example, the advantages of the peroxide are ordinarily realized when it is present in the amount of about 2 parts or less per 100 parts of rubber. However, when an acidic inorganic filler is present, 4 or more parts of peroxide per 100 parts of rubber might be required to give an optimum cure. The use of such a high amount of peroxide is economically undesirable.

In accordance with the present invention, it has been found that in the vulcanization of a rubber composition containing an acidic inorganic filler by means of a peroxide of the class previously defined, the efficiency of vulcanization can be increased markedly by vulcanizing in the presence of both an inorganic alkali and a basic amino compound. Consequently, less peroxide is needed to attain optimum cure. Although the inorganic alkali and the basic amino compound are individually capable of increasing cure efficiency, the combination of the two has a beneficial effect greater than that which would be expected from the use of either alone.

The invention thus provides a process for the vulcanization of a rubber which comprises heating a rubber selected from the group consisting of natural rubber and sulfur-vulcanizable rubbery polymers of at least one compound selected from the group consisting of conjugated diolefins and chloroprene in the presence of an acidic inorganic filler; a peroxide having the formula:

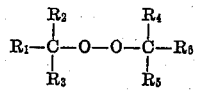

wherein $R_1$ and $R_6$ are aryl and $R_2$, $R_3$, $R_4$, and $R_5$ are hydrogen or alkyl groups of less than 4 carbon atoms; an inorganic alkali; and a basic amino compound.

The following examples are presented to illustrate specific embodiments of the invention. In the examples and elsewhere in this specification, parts and percentages are by weight unless otherwise specified.

EXAMPLE 1

The compositions illustrated in this and all following examples were prepared according to conventional rubber compounding procedure. In all instances there was first prepared a masterbatch by milling together on a standard rubber mill 100 parts of a specified rubber and varying parts of filler(s), coloring ingredients, and processing aids such as plasticizers, lubricants, etc. Following preparation of the masterbatch it was divided into aliquot portions and in each portion there was incorporated, by milling, a specified amount of an organic peroxide together with a basic amino compound or an inorganic alkali or both.

In this example the masterbatch had the following composition:

|  | Parts by weight |
|---|---|
| Butadiene-styrene copolymer (GR–S 1501) | 100 |
| Cumar MH 2½ (a paracoumarone resin comprising a mixture of polymerized indene and polymerized coumarone obtained from solvent naphtha fractions of coal tar—melting point, 115–125° C.) | 16 |
| Red iron oxide | 3.33 |
| Channel black (Micronex W–6 beads) | 0.233 |
| "Suprex" clay (a hydrous aluminum silicate clay in the form of a creamy-white, air-floated powder—sp. gr. 2.6; moisture content, 1% (max.); particle size, 99.83% through 325-mesh screen. Average analysis: 44.26% $SiO_2$, 38.08% $Al_2O_3$, 1.58% $Fe_2O_3$, and 0.90% $TiO_2$—pH 4.5 in water slurry) | 133.33 |

Next, to each portion of the masterbatch there was incorporated, by milling, 2%, based on the weight of rubber, of bis($\alpha,\alpha$-dimethylbenzyl) peroxide and an inorganic alkali or a basic amino compound or a combination of both an inorganic alkali and a basic amino compound in amounts according to Table I. A control portion, to which neither an amine or an inorganic alkali was added, was also prepared for comparative purposes. Each portion was then vulcanized in a multiple-cavity closed mold for 15 minutes at 330° F. The vulcanizates were examined according to standard A. S. T. M. procedures for tensile strength elongation and modulus (tensile stress) at 300% elongation. The vulcanizates prepared from the compositions containing both an amine and an inorganic alkali were found to be decidedly superior to the control and also to the vulcanizates which contained only one of these materials. Table I illustrates the effect of these materials on the modulus (tensile stress) of the vulcanizates at 300% elongation.

Table I.—Modulus at 300% elongation (p. s. i.)

| Amine | Inorganic Alkali | | | | |
|---|---|---|---|---|---|
| | None | ZnO | PbO | Pb₃O₄ | MgO |
| None | No Cure | 0 | 470 | 460 | 360 |
| Triethanolamine | 300 | 480 | 500 | 610 | 570 |
| Tetraethylenepentamine | 430 | 600 | 660 | 760 | 730 |
| Condensation Product of Butyraldehyde and Aniline | 410 | 520 | 490 | 540 | 510 |
| Diphenylguanidine | 480 | 510 | 480 | 550 | 540 |

QUANTITIES (PERCENT OF RUBBER)

| Used Alone | Used in Combination |
|---|---|
| Inorganic Alkali=10% Amine=2% | Inorganic Alkali=5% Amine=1% |

EXAMPLE 2

In this example the composition of the masterbatch, the peroxide, and the amount of peroxide were the same as in Example 1. Calcium oxide and benzyl trimethyl ammonium hydroxide were added to aliquot portions of the masterbatch both individually and in combination. Vulcanization was carried out at a temperature of 300° F. for 10 minutes. The effect of the additions on the Shore A Hardness of the vulcanizates is shown by the data in the following table.

Table II

| Activator | Parts/100 Parts Rubber | Shore A Hardness of Vulcanizate |
|---|---|---|
| CaO | 10 | 66 |
| Benzyl Trimethyl Ammonium Hydroxide | 2 | 60 |
| CaO + Benzyl Trimethyl Ammonium Hydroxide | 5 1 | 73 |

EXAMPLE 3

In this example the masterbatch had the following composition:

| | Parts by weight |
|---|---|
| Butadiene-Styrene copolymer (GR-S 1501) | 100 |
| Cumar MH 2½ | 16 |
| Stearic acid | 2 |
| Paraffin wax | 1 |
| "Suprex" clay | 256 |
| Calcium carbonate | 108 |
| Titanium dioxide ("Titanox" RCHT)[1] | 100 |
| Light hydrocarbon oil (softener) | 9 |

[1] 30% titanium dioxide, 70% precipitated calcium sulfate.

It is to be noted that in this masterbatch one of the fillers is calcium carbonate which is also an inorganic alkali. Accordingly, the further addition of an amine to this masterbatch provides the necessary combination of the invention.

The masterbatch was next divided into two aliquot portions and in each portion there was incorporated 2.5 parts of bis($\alpha,\alpha$-dimethylbenzyl) peroxide per 100 parts of rubber. To one of the portions was added 2.5 parts of dehydroabietyl amine per 100 parts of rubber in the portion. Following vulcanization at 300° F. for 15 minutes the vulcanizates were examined by hand and it was obvious that the vulcanizate prepared from the composition containing dehydroabietyl amine was noticeably harder and stronger than the vulcanizate prepared from the composition that contained no amine.

EXAMPLE 4

The formulation of the masterbatch, the peroxide, and the amount of peroxide in this example are the same as in Example 1. As before, the masterbatch was divided into aliquot portions, and the peroxide added to each portion. There was then added to each portion, except the control portion, a predetermined quantity of magnesium oxide or butyraldehyde-aniline condensation product or both. Each portion was then vulcanized in a multiple-cavity mold for 10 minutes at 330° F. The following table shows the amounts, in parts per 100 parts of rubber, of magnesium oxide and butyraldehyde-aniline condensation product employed and tabulates the physical properties of the resulting vulcanizates.

Table III

| | Composition No. | | | |
|---|---|---|---|---|
| | 1 | 2 | 3 | 4 |
| MgO (parts) | | 10 | | 5 |
| Butyraldehyde-aniline Condensation Product (parts) | | | 2 | 1 |
| Modulus at 300 % (p. s. i.) | No Cure | 640 | 560 | 725 |
| Tensile Strength (p. s. i.) | do | 1,890 | 1,720 | 1,910 |
| Elongation at Break (percent) | do | 740 | 690 | 635 |
| Shore A-2 Hardness | do | 68 | 68 | 71 |

The superiority of composition 4 over the other compositions is evident.

EXAMPLE 5

In this example the composition of the masterbatch was similar to that of Example 1 except that the butadiene-styrene copolymer was replaced with an equal amount of No. 1 smoked sheets of natural rubber. As in the previous example, the masterbatch was divided into aliquot portions and in each portion there was incorporated 3 parts of bis($\alpha,\alpha$-dimethylbenzyl) peroxide. Also to each portion, except a control portion, there was added a predetermined amount of magnesium oxide or tetraethylenepentamine or both. Each portion was next vulcanized in a multiple-cavity closed mold for 45 minutes at 300° F. The following table shows the amounts, in parts per 100 parts of rubber, of magnesium oxide and tetraethylenepentamine employed and gives the physical properties of the vulcanizates.

Table IV

| | Composition No. | | | |
|---|---|---|---|---|
| | 1 | 2 | 3 | 4 |
| Magnesium Oxide (parts) | 10 | None | 5 | None |
| Tetraethylenepentamine (parts) | None | 2 | 1 | Do. |
| Modulus at 300% Elongation (p. s. i.) | No Cure | 1,600 | 2,010 | No Cure. |
| Tensile Strength (p. s. i.) | do | 2,015 | 2,370 | Do. |
| Elongation at Break (Percent) | do | 370 | 350 | Do. |
| Shore A-2 Hardness | do | 58 | 58 | Do. |
| Bashore Resilience (Percent) | do | 33 | 39 | Do. |

The superiority of composition 3 over the other compositions is obvious.

EXAMPLE 6

The procedure of this example is identical to the procedure of Example 5 with the following exceptions:

(1) The natural rubber of Example 5 was replaced with an equal quantity of butadiene-acrylonitrile copolymer (prepared by copolymerizing approximately 74 parts of butadiene with approximately 26 parts of acrylonitrile).

(2) The amount of peroxide was reduced to 2 parts per 100 parts of rubber.

(3) Vulcanization was effected by heating for 10 minutes at 320° F.

The following table shows the composition of each portion and the physical properties of the vulcanizates.

Table V

| | Composition No. | | | |
|---|---|---|---|---|
| | 1 | 2 | 3 | 4 |
| Magnesium Oxide (parts) | 10 | None | 5 | None |
| Tetraethylenepentamine (parts) | None | 2 | 1 | None |
| Modulus at 300% Elongation (p. s. i.) | 1,550 | 1,230 | 1,660 | 1,375 |
| Tensile Strength (p. s. i.) | 1,580 | 1,515 | 1,690 | 1,410 |
| Elongation at Break (Percent) | 300 | 460 | 330 | 340 |
| Shore A-2 Hardness | 65 | 68 | 68 | 60 |

EXAMPLE 7

In order to demonstrate that all peroxides of the class hereinabove defined can be utilized in the practice of the invention, the procedure of Example 1 was repeated by substituting an equimolecular quantity of each of the following peroxides for the bis($\alpha,\alpha$-dimethylbenzyl) peroxide of Example 1:

bis($\alpha,\alpha$-Dimethyl-p-isopropylbenzyl) peroxide
bis($\alpha,\alpha$-Dimethyl-p-methylbenzyl) peroxide
$\alpha,\alpha$-Dimethylbenzyl($\alpha,\alpha$-dimethyl - p - methylbenzyl) peroxide The test data on the vulcanizates paralleled the data shown in Example 1, i. e., the beneficial effect obtained by employing both an inorganic alkali and a basic amino compound as additives was apparent.

As the examples have demonstrated, this invention provides a practical method for increasing the vulcanizing efficiency of a certain class of organic peroxides employed for the vulcanization of a natural or synthetic rubber in the presence of an acidic inorganic filler. While it is not intended to restrict the invention to a positive theory, it is certain from the evidence obtained that the defined class of peroxides is sensitive to the acidity of inorganic fillers to such a degree that the vulcanizing efficiency of the peroxides is significantly lowered.

It would seem logical from the above that any compound capable of neutralizing acidity would be capable of counteracting the harmful effect of the acidic filler. Numerous experiments have confirmed that this, in fact, is true and that any basic compound offsets the acidity of the filler to a degree where vulcanization efficiency is improved.

While the problem has thus been traced to the simple one of counteracting the acidity of the filler, it was further found that the combined effect of an inorganic alkali and a basic amino compound far exceeded the individual effect of either additive alone. No supportable theory or explanation has been developed to explain this phenomenon although a great number of experiments has proved that the only essential requirement of each of these additives is basicity in the presence of the other specified ingredients at the vulcanizing temperature.

The process of the invention has been found applicable for the vulcanization of both natural and synthetic rubbers. Generically, the rubbers which can be vulcanized by the process of the invention can be classified as sulfur-vulcanizable rubbery polymers of at least one compound selected from the group consisting of conjugated diolefins and chloroprene. This includes natural rubber as well as synthetic rubbery polymers such as polymerization products of butadiene and its derivatives and homologues, e. g., methyl butadiene, dimethyl butadiene, pentadiene, and chloroprene. The term also includes copolymers of the conjugated diolefins with other unsaturated organic compounds such as acetylene, styrene, acrylonitrile, isobutylene, etc. The preferred rubbery polymers are natural rubber, butadiene-styrene copolymers, and butadiene-acrylonitrile copolymers.

The acidic inorganic fillers which are an essential component of the invention are those inorganic fillers which have an acidic pH in aqueous slurry. Such fillers are well known to those skilled in the art and need little description. Generally, the majority of such materials are of clay origin and include various kaolin type clays such as those sold under the trade names "Suprex" and "Dixie" clays. Other fillers of synthetic nature which are inorganic and acidic can also be used, e. g., silicic acid, certain types of silica gel, and silicic fillers such as HiSil X303, and Cabosil.

The peroxides used in this invention are di(aralkyl) peroxides having the structural formula:

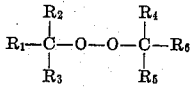

where $R_1$ is an aryl group, $R_2$, $R_3$, $R_4$, and $R_5$ are hydrogen or alkyl groups of less than 4 carbon atoms, and $R_6$ is an aryl group. $R_2$, $R_3$, $R_4$, and $R_5$ may all be the same or each may be a different group or any two or more may be the same or different. Similarly, $R_1$ and $R_6$ may be the same or different aryl groups.

The aryl groups referred to in the above formula may, for example, be phenyl, naphthyl, anthryl, phenanthryl, and the like. The aryl groups may contain alkyl substituents as in the case of methylphenyl, ethylphenyl, propylphenyl, isopropylphenyl, butylphenyl, isobutylphenyl, t-butylphenyl, pentamethylethylphenyl, dimethylphenyl, methylethylphenyl, etc., and the corresponding alkyl derivatives of the other aryl groups mentioned. The term "aryl" as used herein includes alkaryl groups. When an alkyl substituent in an aryl group contains less than 4 carbon atoms, it may be the same as or different from any of $R_2$, $R_3$, $R_4$, or $R_5$. Aryl groups in which the alkyl substituents, if any, contain less than 8 carbon atoms are preferred.

The class of di(aralkyl) peroxides include the following symmetrical or bis(aralkyl) peroxides: dibenzyl peroxide, bis($\alpha$-methylbenzyl) peroxide, bis($\alpha$-ethylbenzyl) peroxide, bis($\alpha$-propylbenzyl) peroxide, bis($\alpha$-isopropylbenzyl) peroxide, bis($\alpha,\alpha$-dimethylbenzyl) peroxide, bis($\alpha$-methyl-$\alpha$-ethylbenzyl) peroxide, bis($\alpha,\alpha$-diethylbenzyl) peroxide, bis($\alpha,\alpha$-dipropylbenzyl) peroxide, bis-($\alpha,\alpha$ - diisopropylbenzyl) peroxide, bis($\alpha,\alpha$ - diisopropylnaphthylmethyl) peroxide, bis($\alpha,\alpha$ - dimethylnaphthylmethyl) peroxide, bis($\alpha,\alpha$ - dimethyl - p - methylbenzyl) peroxide, bis($\alpha$ - methyl - $\alpha$ - ethyl - p - methylbenzyl) peroxide, bis($\alpha,\alpha$ - diethyl - p - methylbenzyl) peroxide, bis($\alpha,\alpha$ - diisopropyl - p - methylbenzyl) peroxide, bis-($\alpha,\alpha$ - dimethyl - p - ethylbenzyl) peroxide, bis($\alpha$ - methyl-$\alpha$ - ethyl - p - ethylbenzyl) peroxide, bis($\alpha,\alpha$ - diethyl - p-ethylbenzyl) peroxide, bis($\alpha,\alpha$ - diisopropyl - p - ethylbenzyl) peroxide, bis($\alpha,\alpha$ - dimethyl - p - isopropylbenzyl) peroxide, bis($\alpha$ - methyl - $\alpha$ - ethyl - p - isopropylbenzyl) peroxide, bis($\alpha,\alpha$ - diethyl - p - isopropylbenzyl) peroxide, bis($\alpha,\alpha$ - diisopropyl - p - isopropylbenzyl) peroxide, bis-($\alpha,\alpha$ - dimethyl - p - t - butylbenzyl) peroxide, bis($\alpha$-methyl - $\alpha$ - ethyl - p - t - butylbenzyl) peroxide, bis($\alpha,\alpha$ - diethyl - p - t - butylbenzyl) peroxide, bis($\alpha,\alpha$ - diisopropyl-p - t - butylbenzyl) peroxide, bis($\alpha,\alpha$ - dimethyl - p - pentamethylethylbenzyl) peroxide, bis($\alpha$ - methyl - $\alpha$ - ethyl-p - pentamethylethylbenzyl) peroxide, bis($\alpha,\alpha$ - diethyl-p - pentamethylethylbenzyl) peroxide, and bis($\alpha,\alpha$ - diisopropyl-p-pentamethylethylbenzyl) peroxide.

Unsymmetrical peroxides containing two aryl groups include the following compounds: benzyl($\alpha$ - methylbenzyl) peroxide, benzyl($\alpha$ - methyl - p - methylbenzyl) peroxide, benzyl($\alpha$ - methyl - p - isopropylbenzyl) peroxide, benzyl($\alpha,\alpha$ - dimethylbenzyl) peroxide, benzyl ($\alpha,\alpha$-dimethyl - p - methylbenzyl) peroxide, benzyl($\alpha,\alpha$ - dimethyl - p - isopropylbenzyl) peroxide, $\alpha$ - methylbenzyl-($\alpha,\alpha$ - dimethylbenzyl) peroxide, $\alpha$ - methylbenzyl($\alpha,\alpha$-dimethyl - p - methylbenzyl) peroxide, $\alpha$ - methylbenzyl-($\alpha,\alpha$ - dimethyl - p - isopropylbenzyl) peroxide, $\alpha$ - isopropylbenzyl($\alpha,\alpha$ - diisopropylbenzyl) peroxide, $\alpha,\alpha$ - dimethylbenzyl($\alpha,\alpha$ - dimethyl - p - methylbenzyl) peroxide, α,α - diisopropylbenzyl(α,α - diisopropyl - p - methylbenzyl) peroxide, and α,α - diisopropylbenzyl(α,α - diisopropyl-p-isopropylbenzyl) peroxide.

In general, the peroxides are characterized by containing at least fourteen carbon atoms and usually not more than about forty carbon atoms. Di(aralkyl) peroxides containing fourteen to about twenty-five carbon atoms are preferred as producing very desirable vulcanizates and because they may be prepared from readily available materials. The symmetrical peroxides of this invention are exceptionally useful since in addition to producing vulcanizates having extraordinary properties they can be prepared in higher yields more easily than the unsymmetrical peroxides. Specific peroxides preferred in this invention are bis(α,α-dimethylbenzyl) peroxide, bis(α,α-dimethyl-p-methylbenzyl) peroxide, and bis(α,α-dimethyl-p-isopropylbenzyl) peroxide.

The di(aralkyl) peroxides decompose at a moderate rate under vulcanization conditions to form aralkoxy free radicals. Thus, bis(α,α-dimethylbenzyl) peroxide decomposes to form two α,α-dimethylbenzyloxy free radicals and an unsymmetrical peroxide such as α,α-dimethylbenzyl(α,α-dimethyl-p-methylbenzyl) peroxide decomposes to produce an α,α-dimethylbenzyloxy free radical and an α,α-dimethyl-p-methylbenzyloxy free radical. The other di(aralkyl) peroxides mentioned above decompose under vulcanization conditions to produce the corresponding free radicals.

The peroxides, both the symmetrical and unsymmetrical peroxides, can be prepared by methods known to the art. A particularly convenient method involves condensation of the corresponding hydroperoxides of the general formula:

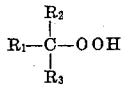

and alcohols having the general formula:

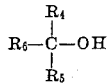

where $R_1$, $R_2$, $R_3$, $R_4$, $R_5$, and $R_6$ are the same as in the general formula for the peroxides of this invention. The amount of alcohol utilized should be at least the theoretical calculated amount to combine with all the hydroperoxide and preferably slightly in excess of this amount. The condensation of the hydroperoxide with the alcohol is carried out in the presence of a catalytic amount up to 0.5% of an acid-acting condensation catalyst based on the weight of the alcohol, and the temperature used is between 50° and 120° C. p-Toluene sulfonic acid may be utilized as the acid-acting condensation catalyst. The hydroperoxides and alcohols mentioned above may be prepared in accordance with processes well known to the art.

The quantity of peroxide utilized will depend to a great extent upon the conditions to be utilized during vulcanization. In general, the quantity may vary from 0.1% to 10% based on the weight of rubber. The preferred amount is from about 0.25% to about 3.0%. The amount of peroxide can also vary depending upon the properties desired in the final vulcanizates.

The inorganic alkalies which are operable in the invention are those inorganic compounds which have basic properties in an acid environment. Thus, there is included not only those inorganic alkalies which are wholly basic but also inorganic compounds which are amphoteric. As representative of such compounds there can be mentioned the oxides and hydroxides of the alkali and alkaline earth metals, e. g., oxides and hydroxides of sodium, potassium, lithium, calcium, barium, strontium, etc. Also there is included amphoteric oxides and hydroxides of aluminum, zinc, chromium, lead, and tin (both stannous and stannic). There can also be employed alkaline salts such as carbonates, acetates, borates, resinates, stearates, oleates, and the like of the alkali and alkaline earth metals. Similarly, amphoteric salts of metals such as aluminum, lead, zinc, and tin can be employed. Other inorganic alkalies within the scope of the invention will be readily apparent to those skilled in the art since the only essential characteristic of such materials is alkalinity in the environment of the invention.

The basic amino compounds include all ammonia and all organic compounds having one or more amino groups that are basic in character. Representative of organic compounds having one or more amino groups that are operable in the invention are methylamine, ethylamine, propylamine, butylamine, amylamine, hexylamine, heptylamine, stearylamine, isobutylamine, secondary butylamine, tertiary butylamine, isoamylamine, secondary amylamine, tertiary amylamine, cyclohexylamine, dimethylamine, diethylamine, dibutylamine, ethylmethylamine, dimyricylamine, diisobutylamine, diisoamylamine, trimethylamine, triethylamine, tripropylamine, tributylamine, triisobutylamine, dimethylammonium hydroxide, triethanolamine, diethanolamine, ethanolamine, urea, thiourea, diphenylguanidine, triphenylguanidine, di-o-tolylguanidine, hexamethylenetetraamine, dimethyl, hydrazine, aniline, o-toluidine, m-toluidine, p-toluidine, xylidine 2,3, xylidine 3,5, benzylamine, diphenylamine, n-methylaniline, n-ethylaniline, dimethylaniline, diethylaniline, α-naphthylamine, β-naphthylamine, rosin amine, o-phenylenediamine, m-phenylenediamine, p-phenylenediamine, pyridine, quinoline, and piperidine. All of the foregoing amines satisfy the requirement of the invention of being basic compounds that coact with the inorganic alkali to offset the harmful acidic character of the acidic inorganic filler. Other more complex amino compounds can also be used as exemplified by the condensation products of various aldehydes and amines, e. g., condensation product of aniline and formaldehyde, condensation product of aniline and acetaldehyde, condensation product of aniline and butyraldehyde, condensation product of butylamine and butyraldehyde, and condensation product of formaldehyde and urea. Similarly, the condensation product of aniline and α-ethyl-β-propyl acrolein, the reaction product of ethyl chloride, formaldehyde, and ammonia, and the reaction product of acetaldehyde and ammonia can be used.

The boiling point of the basic amino compound is of some significance with regard to the types of compounding and vulcanization procedures which can be used although it is not a limiting factor in the invention. For example, the majority of vulcanizable rubber compositions are prepared by dry compounding in which procedure the unvulcanized rubber is milled with fillers, curatives, etc. in mechanical apparatus such as rubber mills and the like. During this type of compounding, a considerable amount of heat is generated in the mix and, consequently, any basic amino compound which is incorporated in this manner should have a boiling point of at least 140° C. in order not to be volatilized.

In other types of compounding, however, the boiling point of the basic amino compound is not a limitation and ammonia or any of the amino compounds previously listed can be employed. For example, one known method of vulcanization is accomplished by heating in a steam autoclave. In this type of vulcanization, ammonia or a low-boiling amine can be introduced in gaseous form with the steam whereby the ammonia or amine will have the same effect as if initially mixed with the rubber.

In other applications, such as the manufacture of rubber doughs and cements, it is possible to incorporate additives at room temperature and to vulcanize under pressure. In this type of vulcanization, any basic amino compound which is liquid at room temperature can be employed.

The amounts of filler, inorganic alkali, and alkaline-reacting organic amine that can be used in the invention are widely variable. Generally speaking, the acidic inorganic filler can be used in any amount in which rubber fillers are conventionally used. Generally, this is from about 10 to 750 parts per 100 parts of rubber. The acidic inorganic filler, of course, need not comprise the entire amount of filler and other fillers may be present as desired or needed.

The amount of inorganic alkali can be varied considerably. The advantages of the invention are observed when the amount of inorganic alkali is as low as 0.1 part per 100 parts of rubber and, correspondingly, the amount of inorganic alkali (which in some cases may also act as a filler) can be as high as about 750 parts per 100 parts of rubber. The amount of basic amino compound is also widely variable and as little as 0.1 part per 100 parts of rubber is productive of the advantages specified for the invention. The upper limit to the amount of amino compound is solely a practical matter and will vary according to the nature of the compound and the nature of the vulcanizing composition. As a general statement it can be stated that the amount of amino compound should not exceed about 20 parts per 100 parts of rubber and, as a practical matter, will seldom exceed 10 parts per 100 parts of rubber.

The manipulative steps of the vulcanization process are the same as those employed in the prior art and any of the prior art techniques can be used. As a general rule, however, the peroxide vulcanizing agents employed in the invention require a slightly higher vulcanizing temperature than does sulfur. For this reason, a vulcanizing temperature of from about 275° to 350° F. is preferred although temperatures within the range of 250° to 400° F. may sometimes be used.

What I claim and desire to protect by Letters Patent is:
1. A process for the vulcanization of a rubber which comprises heating a composition containing a rubber selected from the group consisting of natural rubber and sulfur-vulcanizable rubbery polymers of at least one compound selected from the group consisting of conjugated diolefins and chloroprene in the presence of an acidic inorganic filler; a peroxide having the formula:

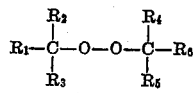

wherein $R_1$ is aryl, $R_2$, $R_3$, $R_4$, and $R_5$ are selected from the group consisting of hydrogen and alkyl groups of less than 4 carbon atoms, and $R_6$ is aryl; an inorganic alkali; and a basic amino compound.

2. The process of claim 1 in which the inorganic alkali is zinc oxide.
3. The process of claim 1 in which the inorganic alkali is an oxide of lead.
4. The process of claim 1 in which the inorganic alkali is magnesium oxide.
5. The process of claim 1 in which the inorganic alkali is calcium oxide.
6. The process of claim 1 in which the basic amino compound is triethanolamine.
7. The process of claim 1 in which the basic amino compound is tetraethylenepentamine.
8. The process of claim 1 in which the basic amino compound is diphenylguanidine.
9. The process of claim 1 in which the peroxide is bis($\alpha,\alpha$-dimethylbenzyl) peroxide.
10. The process of claim 1 in which the rubber is natural rubber.
11. The process of claim 1 in which the rubber is a synthetic rubbery copolymer of butadiene and styrene.

References Cited in the file of this patent
UNITED STATES PATENTS

| | | |
|---|---|---|
| 1,249,181 | Ostromislensky | Dec. 4, 1917 |
| 2,403,771 | Vaughn et al. | July 9, 1946 |

OTHER REFERENCES

Braden et al.: I. R. I., vol. 31, No. 6, December 1955, pp. 155–165, 260/Peroxide.